Figure 2:
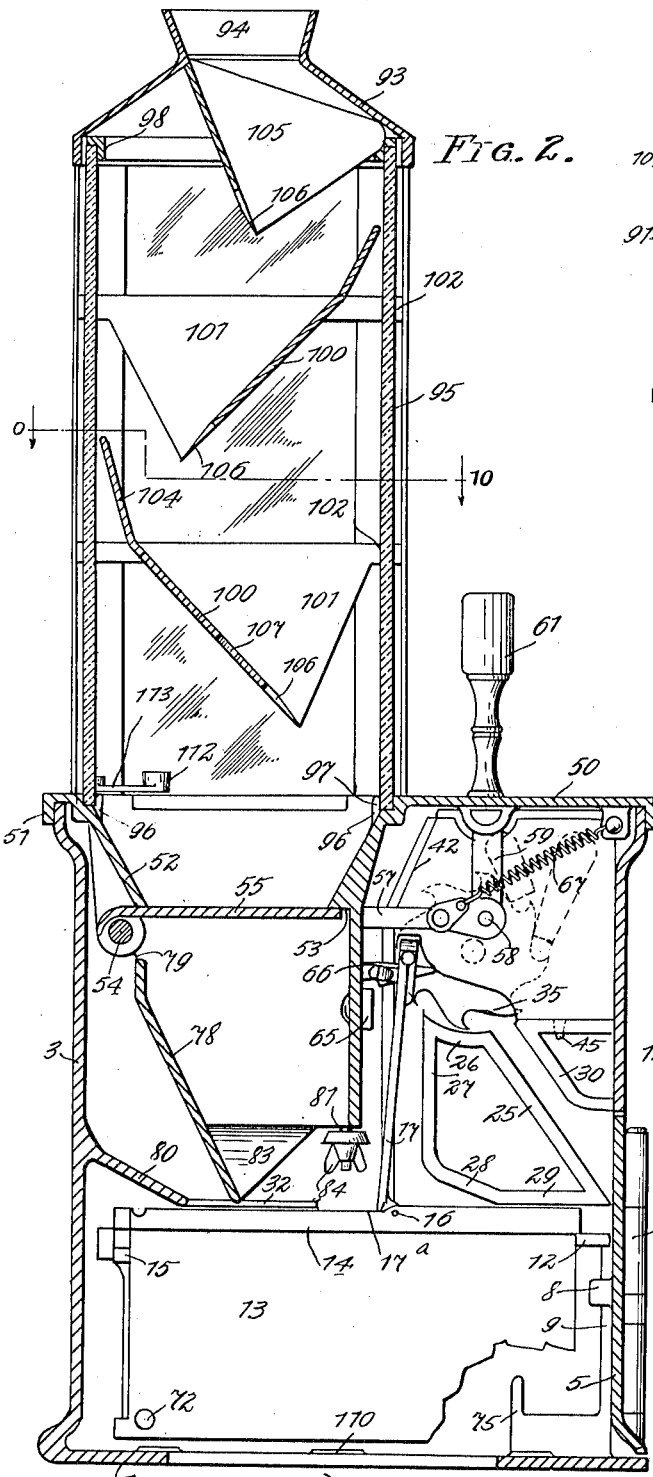

W. T. COOK.
FARE BOX.
APPLICATION FILED APR. 22, 1913.

1,105,620.

Patented Aug. 4, 1914.
4 SHEETS—SHEET 1.

Inventor.
Walter T. Cook,
By Hull & Smith
Attys.

Witnesses:
R. L. Bruck.
Brennan B. West

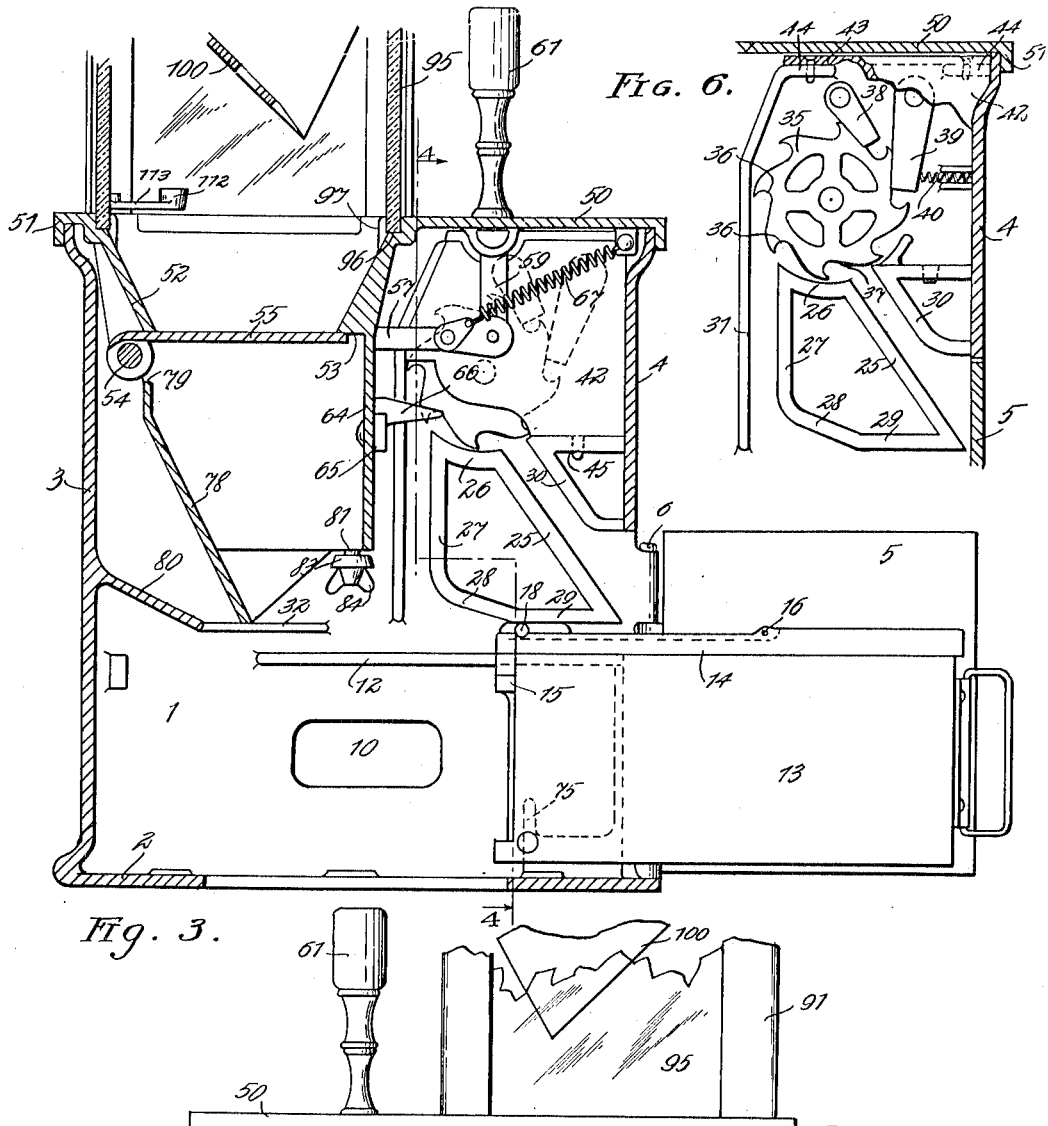

W. T. COOK.
FARE BOX.
APPLICATION FILED APR. 22, 1913.
1,105,620.
Patented Aug. 4, 1914.
4 SHEETS—SHEET 3.
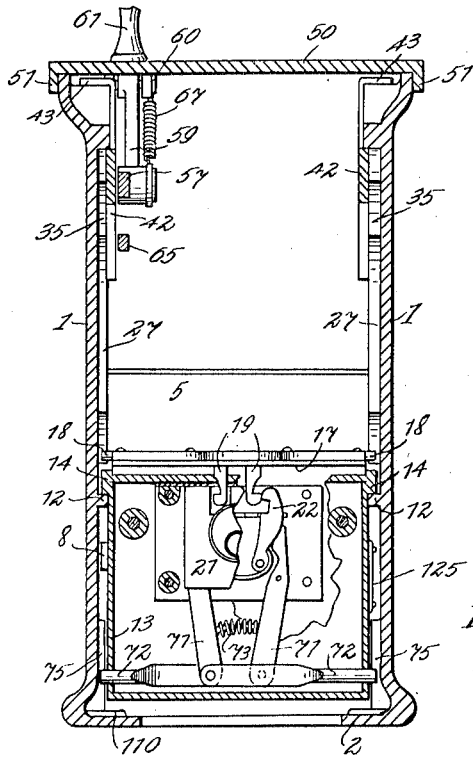
FIG. 4.
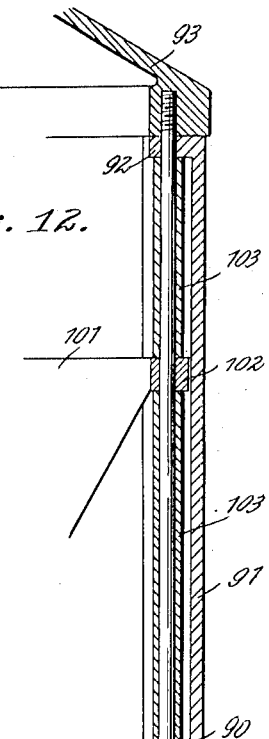
FIG. 12.
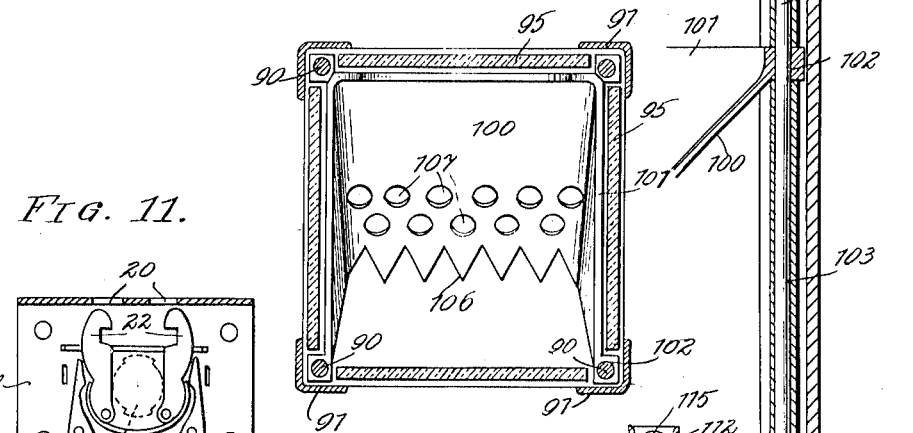
FIG. 11.
FIG. 10.
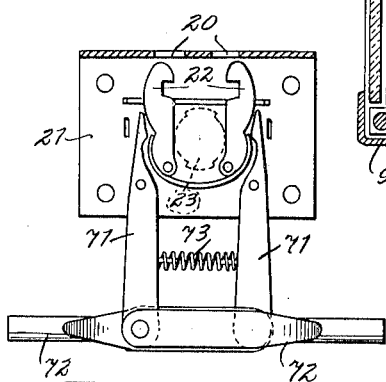
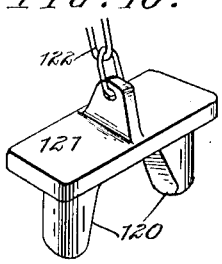
FIG. 14.
Witnesses:
R. L. Bruck
Brennan B. West
Inventor.
Walter T. Cook
By Hull & Smith
Attys

W. T. COOK.
FARE BOX.
APPLICATION FILED APR. 22, 1913.

1,105,620.

Patented Aug. 4, 1914.

4 SHEETS—SHEET 4.

Witnesses:
R. L. Bruck.
Brennan B. West

Inventor.
Walter T. Cook
By Hull & Smith
Attys.

UNITED STATES PATENT OFFICE.

WALTER T. COOK, OF CLEVELAND, OHIO.

FARE-BOX.

1,105,620.　　　　Specification of Letters Patent.　　Patented Aug. 4, 1914.

Application filed April 22, 1913. Serial No. 762,816.

*To all whom it may concern:*

Be it known that I, WALTER T. COOK, a citizen of the United States, residing at Cleveland, in the county of Cuyahoga and State of Ohio, have invented a certain new and useful Improvement in Fare-Boxes, of which the following is a full, clear, and exact description, reference being had to the accompanying drawings.

This invention relates to fare boxes or money collection receptacles such as are at present used largely upon street cars and the like but which may also conveniently be employed in collecting admission fees to recreation parks, ferries, certain kinds of amusement places, and in other situations where a single definite fare or admission fee is charged. Inasmuch, however, as the present use for devices of this character is largely confined to use with street cars, the description of the same will bear particular reference to this use but without any intention to circumscribe the uses of the invention.

The object of the present invention is the improvement of devices of this type in point of simplicity, reliability, cheapness, and security; the provision of a device of this character having a new and improved construction of inspection box wherein the clogging or obstruction of the passageway by tickets, transfers, or the like shall be reduced to a minimum and from which the removal of fares shall be as nearly impossible as can be made; the provision of a collection receptacle having a movable box therein for the reception of the fares, said box being arranged to be withdrawn by the conductor but being so constructed as to be removable only in case it be actually locked; the provision of novel and simplified means for preventing the escape or discharge of coins, tokens, or tickets, from the inspection box unless the collection receptacle be in place ready to receive the same; the provision of means for preventing the removal of the collection receptacle excepting while the passageway between the inspection box and receptacle is open, so that no coins, tokens, or tickets may be left within the inspection box; the provision of means absolutely preventing the removal of the collection receptacle without the actual locking of the cover thereof; the provision of means for preventing the insertion of the collection receptacle into the casing excepting with its cover open so that fares can be transferred from the inspection box into the same; the provision of a new and improved construction and arrangement of parts so as entirely to prevent access to the securing devices whereby the parts are fastened together excepting after the removal of said collection receptacle; the provision of a construction preventing the lodgment or stoppage of the coins, tokens, or tickets, at any point between the inspection box and the collection receptacle; while further objects and advantages of the invention will become apparent as the description proceeds.

One embodiment of my invention and the one which is preferred for most purposes is illustrated in the drawings accompanying and forming a part of this application, wherein—

Figure 1:
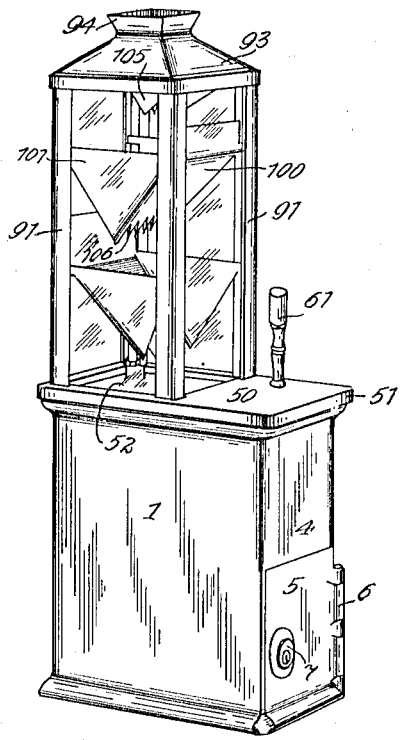
Figure 13:
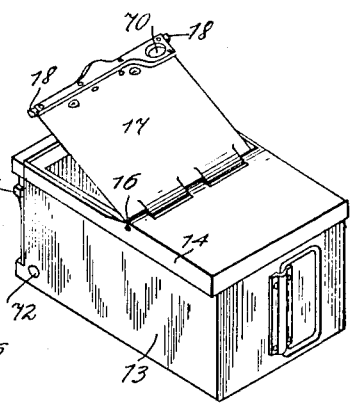
Figure 7:
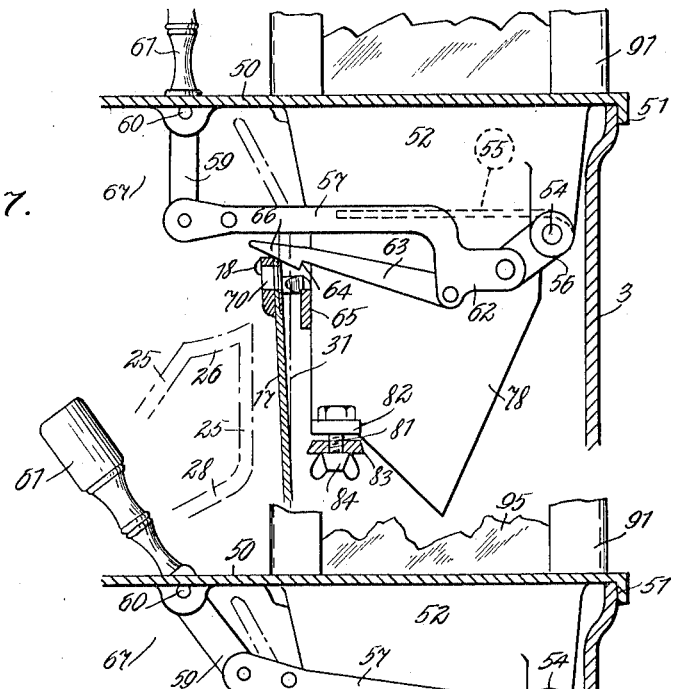
Figure 8:
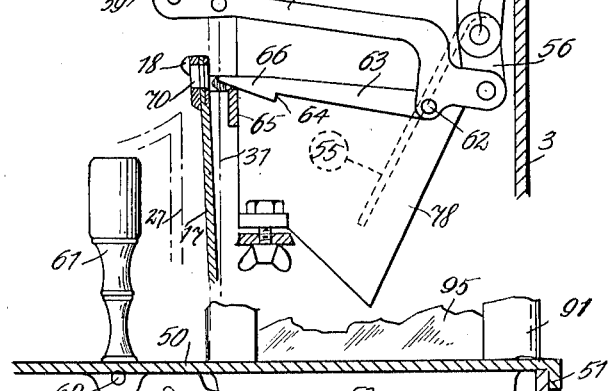
Figure 9:
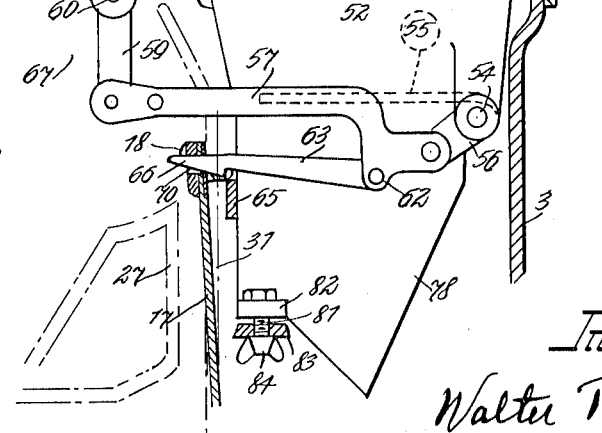

Figure 1 is a perspective view of the complete fare box; Fig. 2 is a vertical, longitudinal, cross-sectional view through the same, the collection receptacle being shown in receiving position; Fig. 3 is a vertical, longitudinal, cross-sectional view through the fare box, the collection receptacle being illustrated in a partially removed position; Fig. 4 is a vertical, transverse, cross-sectional view taken upon the broken line 4—4 of Fig. 3 and looking in the direction of the arrows; Fig. 5 represents an elevation of a portion of the right hand side of the fare box, a portion of the casing being broken away to illustrate the condition of the operating mechanism when the collection receptacle is absent; Fig. 6 is a detail view of a portion of the device illustrated in Fig. 3, the operating handle being omitted and the cover plate thereunder being partially broken away; Fig. 7 is a view similar to Fig. 5 showing the condition of the parts when the collection receptacle is first inserted; Fig. 8 is a similar view showing the position of the various operating parts when the same are moved to permit the discharge of fares from the inspection box; Fig. 9 is a similar view showing the position of the parts with the receptacle in place and the inspection box closed; Fig. 10 is a horizontal, transverse, cross-sectional view taken upon the broken line 10—10 of Fig. 2 and looking downwardly; Fig. 11 is a detail view of a portion of the receptacle lock and coöperating mechanism; Fig. 12 is a detail view illustrating the method of assembling the parts of the inspection box together;

Fig. 13 is a perspective view of the cash box showing the cover thereof in open position ready to be inserted into the casing; and Fig. 14 is a perspective view of the staple whereby the lock may be plugged and the accidental locking of the cover prevented prior to its insertion into the casing.

Describing the parts by reference characters the casing of my improved fare box preferably consists of a rectangular hollow metal casting having walls 1—1, bottom 2, back 3, and front 4, cast in a single piece but having an open top. The front 4 is formed adjacent to its lower portion with a rectangular aperture adapted for the reception of a swing door 5 which is pivoted to the casing by means of a suitable hinge 6 and may be secured in closed position by means of a suitable lock as shown at 7. The rearward edge of the door is formed with an integral hook 8 adapted to engage a suitable rib 9 carried by the casing so as to prevent the removal of the door even if the hinge be tampered with or destroyed. The side of the casing may also be formed with an inspection opening 10 for a purpose hereafter described.

Projecting inwardly from each of the walls 1—1 is an integral, horizontal rib 12 forming a guide and to these guides is slidably fitted a cash box or collection receptacle indicated generally by 13. This receptacle is preferably generally rectangular in shape and has at the upper margin of each of its sides a laterally projecting portion 14, here formed as a part of the top of the box, adapted to rest upon the ribs 12—12 and support the receptacle in its place. The forward end of the box is formed at each side with a laterally projecting ear 15 adapted to fit beneath the corresponding rib 12 and fix definitely the vertical position of the receptacle.

Pivoted to the top of the box upon a transverse axis 16 intermediate the ends thereof is a cover 17. The width of this cover is preferably substantially the same as that of the body of the receptacle 13 and the projection 14 is preferably formed with a countersunk portion 17$^a$ adapted to receive the cover when the same is closed so as to prevent the insertion of a prying tool thereabeneath. The free end of the cover is provided at each side with a laterally projecting ear 18 extending therefrom to substantially the same distance as the projections 14. At its free end the cover 17 is provided with a pair of parallel notched posts 19—19, adapted to project into the apertures 20—20 of a lock 21 carried by the end of the receptacle 13 and there be engaged by the pivoted dogs 22—22 and thereby held closed until the dogs are released by the rotation of the cam 23 shown in dotted lines in Fig. 11. The height of the projection 14 is greater in the rear of the hinge 16 than at the forward side of that hinge, (see Fig. 2) and the ears 18 overlie the forward portion of the projection 14 when the cover is closed, as shown in Fig. 3, the combined thickness of the ear 18 and the projection 14 at this point being substantially equal to the height of the projection 14 at the rearward end of the receptacle.

Formed on the interior of each of the walls 1 above the rib 12 and parallel thereto is a rib of irregular form for the guidance of the ears 18 and the consequent operation of the cover 17. This rib has an inclined portion 25 leading upwardly and rearwardly from a point just within the door 5, an arcuate portion 26 at the upper end of said inclined portion, a vertical portion 27 at the rear of said arcuate portion, a wedging portion 28 at the bottom of said vertical portion, and a horizontal portion 29 connecting the end of the wedge portion 28 and the beginning of the inclined portion 25, the portion 29 being parallel to the rib 12 and spaced thereabove a distance equal to the height of the ears 18 over the bottom of the projection 14 when the cover is closed. Above the inclined portion 25 of this rib is another rib 30 also inclined and spaced therefrom a distance sufficient to permit the passage of the ears 18, and at the rear of the vertical portion 27 is a vertical rib 31 also spaced from the portion 27 sufficiently to permit the passage of the ears 18. The lower end of the rib 31 is spaced above the rib 12 a sufficient distance to permit the passage of the widest portion of the projection 14. Beyond the rib 31 the side of the box is formed with another rib 32 parallel to the rib 12 and spaced thereabove a sufficient distance to permit the insertion therebetween of the narrower part of the projection 14 but not to permit the passage of the ears 18 when the cover is closed. This prevents the insertion of the receptacle except in the prescribed manner.

Pivoted to the inside of the casing wall above and concentric with the arcuate rib portion 26 is a ratchet wheel 35 having slanting teeth formed by inclined portions 36 and abrupt portions 37, these teeth being so disposed that the abrupt portions thereof are presented toward the passageway defined by the ribs 25 and 30. Also pivoted to the interior of this casing wall are pawls 38 and 39 adapted to engage the teeth of the ratchet to prevent retrograde movement thereof. In the present embodiment, the pawl 38 is of a gravity nature, while the pawl 39 is actuated by a spring 40 secured to the side wall. While a single pawl would probably operate reliably, two are used for purposes of greater safety. The length of the pawls and their position is arranged so as to stop the ratchet wheel with the inclined portions 36 of the various teeth in substantial alinement with the vertical rib portion 27. All of the ratchet wheel excepting a portion adjacent to the rib 26 is covered and inclosed by a plate 42, said plate having a laterally projecting lip 43 secured by means of suitable screws to a horizontal ledge 44 carried by the casing. This plate also has a projection 45 adapted to project into a suitable aperture formed in a protuberance carried by the casing wall so as to prevent its being pried away. The necessity for this plate and the reason for securing it in this manner will be pointed out hereafter. The various ribs and the ratchet wheels are preferably duplicated on the opposite casing wall as shown.

The open upper end of the casing is closed by means of a cover 50 which carries the inspection box, coin chute, and other operating parts, and which prevents access to the remainder of the mechanism. Said cover preferably consists of a flat cast-metal plate having a depending marginal lip or flange 51 adapted to overlap the upper ends of the casing walls. Formed in this cover at the portion above the inner end of the receptacle is an integral hopper 52 terminating in a horizontal, flat, downwardly facing ledge 53. Journaled in suitable brackets carried by this hopper portion is a rock shaft 54 to which is secured the trap or door 55 adapted to seat against the ledge 53 and close the hopper.

The shaft 54 is parallel to the axis of the ratchet wheels 35 and the side of the hopper is spaced from the wall of the casing a sufficient distance to permit the introduction of the operating mechanism illustrated in Figs. 5, 7, 8, and 9. Secured to the end of the rock shaft 54 is an arm 56 to the end of which is pivoted a horizontal link 57, the opposite end of which is articulated at 58 to a lever 59 pivoted at 60 to suitable brackets carried by the bottom of the cover 50 and having at its upper end a handle 61 whereby it may be rocked. The link 57 is shown as provided with an offset 62 to which is pivoted a reciprocable hook 63 having a shoulder 64 adapted to engage a bracket 65 carried by the hopper. Beyond this shoulder the hook is extended to form an elongated tapering head 66 which projects out past the ratchet wheel 35 into the path of the ears 18. A spring 67 secured to the link 57 and to the casing as illustrated in Figs. 2, 3, 4, and 5, tends to draw the link forwardly and maintain the door 55 closed. It will be apparent upon inspection of Figs. 5, 7, 8, and 9, however, that when the lever 59 is moved the tendency will be to reciprocate the link 57 and turn the rock shaft 54 opening the door 55, but that this movement will be entirely prevented in case the shoulder 64 of the hook 63 be in engagement with the bracket 65. This is the condition of the parts when the collection receptacle is absent as illustrated in Figs. 3 and 5, and it is impossible to swing the door 55 and dump fares from the inspection box unless the collection receptacle be in its proper place and ready to receive the same.

The receptacle 13 is introduced into the casing with its cover partially open whereupon the projections 18—18 ride upwardly upon the inclined ribs 25, pass the arcuate portions 26 with consequent displacement of the ratchet wheels 35 and into contact with the vertical ribs 31 up which they ride until the cover stands nearly or quite vertical and the receptacle 13 has been fully inserted. This causes the end of the cover to engage the head 66 of the hook 63 as illustrated in Fig. 7 and lift the same out of contact with the bracket 65, the length of the cover 17 being chosen with this specifically in view. It is now possible to operate the door 55 without hindrance, the receptacle being now in a position to receive any coin, ticket, or token deposited in the inspection box. Upon the closing of the door 55, however, the head 66, instead of riding over the edge of the cover 17 as illustrated in Fig. 7, is projected through an aperture 70 therein as illustrated in Fig. 9, the lower edge of this aperture being spaced above the bracket 65 a sufficient distance to prevent the engagement of the hook therewith.

In order to remove the receptacle 13 it is first necessary to rock the lever 59 and open the door 55 which withdraws the head 66 from the aperture 70 and assures that all the contents of the inspection box shall be transferred to the collection receptacle. If this be not done, it is obvious that the engagement of the head 66 with the cover will absolutely prevent the removal of the receptacle. Granted, however, that this head is shifted so as to free the cover, then upon the removal of the receptacle the cover first falls of its own weight to a position where the same is nearly closed, and is afterward tightly closed by the wedging action of the rib portions 28 upon the projections 18.

It has been suggested that if a dishonest conductor were to plug the notches of the dogs 22—22 or of the posts 19—19 so as to prevent the dogs from closing and engaging the posts, it would be possible for him to remove the receptacle and thereafter open the same and have access to its contents. In order to prevent this contingency, I pivot adjacent to each dog a lever 71, and to the end of each lever I articulate a reciprocable bolt 72, the ends of which are supported in apertures formed in the walls of the receptacle 13, as shown in Figs. 2, 3, and 13. When the dogs 22—22 are displaced as upon the locking or unlocking of the cover, the bolts 72—72 are protruded beyond the walls of the box as illustrated in Fig 4. When the dogs are in inward position, as is their usual state, the bolts are held in retracted position by means of a suitable spring 73. Accordingly if a dishonest conductor were to fill the notches of the posts or of the dogs with wax or like material to prevent the closing thereof, the bolts 72—72 would be protruded upon the attempt to withdraw the box and would be unable to be retracted again, thereupon they would catch upon shoulders 75—75 formed upon the casing walls and prevent the further removal of the receptacle. While I have shown two dogs and two levers in these drawings, it is obvious that the number of levers and their arrangement would depend upon the number and arrangement of the dogs, and the same can be varied to any extent desired within the limits of my invention.

Below the ledge 53 the walls of the hopper are continued downwardly as illustrated at 78 to form a chute to convey the coins, tickets, or tokens to the receptacle, the wall of the chute being formed with a suitable slot at 79 through which the door 55 projects. I have also shown the interior of the casing as formed with a web or plate 80 partially overhanging the rear end of the receptacle so as to prevent coins or metal tokens from rebounding out of the receptacle.

Preferably the cover 50 and its associated parts are secured upon the casing by means of suitable bolts 81 secured in ears 82 formed on the chute 78. These bolts project through brackets 83 formed upon the casing walls 1 and are secured by thumb-nuts 84 which permit the easy removal of the cover 50 and its associated parts when desired. The position of the cover 17 adjacent to the side of the chute absolutely prevents access to these nuts while the receptacle is in place, and the removal of the receptacle to give access to these nuts invariably results in the locking of the receptacle and so defeats any attempt at robbery.

Reference has already been made to the mode of securing in place the plates 42—42 whereby the ratchets 35—35 are covered. It will be seen that when the cover 50 is secured in place the screws which hold these plates are entirely concealed, rendering impossible the removal of the same. The ratchet wheels 35—35 are nothing in effect but switches which permit the projections 18 to pass forwardly upon one track and back along the other track and prevent their movement in the opposite direction. It is obvious that so far as the general operation of my improved fare box is concerned, any other suitable switch device could be employed, but the ratchet wheel is the only device I have yet discovered which is absolutely irreversible and cannot by any possibility be tampered with, especially when the same is covered and concealed as illustrated herein.

In order to prevent abstraction of the coins, tickets, or tokens, after leaving the passenger's hand and at the same time to permit the conductor to inspect the same to assure himself of their character, quantity, and genuineness, I provide an improved type of inspection box which will now be described. Formed in the cover 50 at the corners of the hopper 52 are vertical apertures in which are inserted the lower threaded ends of rods 90. Secured about each of these rods is a right-angular, metallic, corner piece 91, formed at its inner side with suitable integral perforated ears 92 through which said rods project. Overhanging the upper ends of these corner pieces is a frusto-pyramidal top 93 having therein a hopper-opening 94 for the reception of the fares. This arrangement provides a rectangular skeleton box. The sides of the box are closed by means of plate glass strips 95 which fit against the inner faces of the corner pieces 91 and rest at their lower ends upon ledges 96 formed at the sides of the hopper 52. Integral fingers 97 formed at intervals around these ledges secure the glass against inward displacement. The formation of the ledges slightly narrower than the thickness of the glass prevents the lodgment of coins, tickets, or other tokens thereon. The upper ends of the plates are held in place by means of a rectangular metallic support 98 located within the top 93. The various parts of the inspection box are secured together by having the top 93 secured to the upper ends of the rods 90, the lower ends of these rods being held in place by means of thumb nuts 99.

In order to prevent coins, tokens, or tickets, from being fished out of the inspection box, and even out of the collection receptacle via the door 55, I employ suitable deflecting members within the inspection box as will now be described. Each of these deflectors preferably consists of a metallic hopper having an inclined bottom 100 and sides 101. The corners of the same are formed with apertured ears 102 through which the rods 90 are passed as shown in Fig. 12. These deflectors are spaced apart and away from the ends of the inspection box by means of hollow sleeves 103 surrounding the rods 90 and interposed between the ears 102. The sides 101 preferably lie closely adjacent to the glass plates so as to prevent tickets from being caught therebetween, and the bottoms 100 may be extended upwardly as shown at 104 for the same purpose. Successive deflectors are preferably located in opposite directions as illustrated in Figs. 1 and 2, and the number of the same and their shape will depend upon the kind and size of the tickets or tokens which are expected to be employed. In the present embodiment I have illustrated, in addition to the deflectors described, a small deflector 105 located immediately beneath the hopper opening 94 and secured to the top 93 in any suitable manner as by screws.

The lower edge of each deflector is preferably serrated as illustrated at 106, both the points and sides of the teeth being carefully sharpened. This absolutely prevents successful fishing for coins or tickets by means of a line baited with an adhesive substance as has sometimes been done. Some or all of the plates may also be formed with apertures 107 so as to permit the conductor to view the entire bottom of the hopper so as to examine the fares deposited therein.

In some cases cars are made with only a single place for the motorman and only a single place for the conductor, the car being always operated in the same direction. In a case like this the fare box casing is generally secured permanently in position by means of suitable screws projected through bosses 110 in the bottom of the casing and engaging any suitable support. This means of securing is obviously entirely safe, since access to those screws can be had only by removing the cover 50 and its associated parts, and the cover 50 can be removed only after the receptacle 13 has been abstracted. Other cars, however, are made to be operated in either direction which requires a shift in the positions of the conductor and motorman at the end of each run. In such cases, the fare box is not secured firmly in position so as to permit the conductor to carry it with him from one point to another. In an instance wherein the whole fare box is removable it has been found that a dishonest conductor by careful manipulation can shake out of the collection receptacle a portion of the coins or tokens therein. Inasmuch, however, as there is no excuse for the inversion of the box in the ordinary course of business, I provide within the inspection box a telltale which will indicate instantly whether the box has been inverted. This tell-tale consists of a small metallic cup 112 carried at the end of an arm 113 which has at its opposite end an eye 114 surrounding one of the rods 90. A common glass marble 115 placed in this cup cannot by any possibility be removed from the same excepting upon the inversion of the inspection box and after having been removed it cannot by any possibility be replaced therein by the conductor but invariably falls through the door 55 and into the collection receptacle 13, thereby indicating beyond peradventure the conductor's attempted dishonesty.

All of the receptacles 13 after their removal are sent to the auditor's office or financial department to be opened and contents counted. The boxes are then returned to the different car barns unlocked and if any cover should be accidentally closed before insertion into the casing that box would have to be sent back to the office to be opened. To prevent the accidental closing of the boxes, I provide a blanking device or staple illustrated in Fig. 14, the same in this embodiment consisting of a pair of spaced parallel legs 120 connected by a cross bar 121 and adapted to be projected into the apertures 20—20 so as to prevent the closing of the cover. A chain 122 is secured to this cross bar and also preferably to the interior of the receptacle so as to prevent the loss of the staple and to facilitate its abstraction. It will be seen that upon the insertion of this staple, the dogs 22—22 are rocked so as to protrude the bolts 72—72, thus absolutely preventing the insertion of the receptacle without the removal of the staple. It has already been pointed out how the ribs 32 prevent the insertion of the receptacle with its cover closed.

Each receptacle preferably bears upon its side a number plate 125 visible through the aperture 10 when the box is fully inserted. It is therefore easy to keep track of the location of the different receptacles. Also in the actual operation of my improved fare box it is frequently the custom to require the conductors, immediately before the drawing of the receptacles, to drop into the inspection box a slip of paper having written thereon the conductor's name and number, the number of his car, and the number of his run, which slip is then transferred to the receptacle in the operation of removing the same and serves as a record of the car, run, and crew. This fare box when employed in the manner described has been found to safeguard the company so well as to permit the elimination of the fare register and the consequent distraction of the conductor's attention.

Although I have described my improved fare box entirely in connection with street railroad work, it is obvious that the same can be employed in any place where it is necessary to collect and preserve safely admission fees of any sort. It is also obvious that many changes in matter of construction, arrangement, and design could be made without departing from my invention or sacrificing the advantages thereof. It is also obvious that certain of the features of my invention could be omitted and other features retained without entirely sacrificing the benefits of the device but with the omission of only certain functions.

While I have described my invention in detail, I do not therefore propose to be limited to such details, except as the same may be positively included in the claims hereto annexed or may be rendered necessary by the prior state of the art.

Having thus described my invention what I claim is:

1. In a fare box, the combination, with a casing and a receptacle insertible therein, said receptacle having a movable cover, of a spring lock adapted to prevent the opening of said cover once the same has been closed, means for closing said cover upon the removal of said receptacle from said casing, and a protrudable member coöperating with said lock and adapted to be displaced so as to prevent the insertion of said receptacle into said casing unless said locking parts be in a condition actually to secure said cover.

2. In a fare box, the combination, with a casing and a receptacle insertible therein, said receptacle having a movable cover and a spring lock adapted to prevent the opening of said cover once the same has been closed, of an inspection box carried by said casing and having a discharge opening beneath which said receptacle is inserted, displaceable means normally closing said opening, a member movable with said displaceable means and arranged to engage a part of said casing when said receptacle is absent, so as to prevent the moving of said displaceable means out of obstructing position, said member also being arranged to engage a part of said receptacle when said means is in obstructing position so as to prevent the removal of said receptacle until said displaceable means has been moved out of obstructing position, and means for closing said cover upon the removal of said receptacle from said casing.

3. In a fare box, the combination, with a casing and a receptacle insertible therein, said receptacle having a movable cover and a spring lock adapted to prevent the opening of said cover once the same has been closed, of means for closing said cover upon the removal of said receptacle from said casing, and means coöperating with said lock and preventing the removal of said receptacle from said casing unless the locking parts be in actual securing engagement with said cover.

4. In a fare box, the combination, with a casing and a receptacle insertible therein, said receptacle having a movable cover and the body of the receptacle having a spring pressed locking member adapted to engage said cover and prevent the opening thereof once the same has been closed, of means for closing said cover upon the removal of said receptacle from said casing, a stop device carried by said receptacle and movable transversely of the direction of movement thereof, means normally holding said stop device in retracted position, and connections between said stop device and said locking member whereby upon the movement of said locking member out of engaging position said stop device will be protruded so as to engage said casing.

5. In a fare box, the combination, with a casing and a receptacle insertible therein, said receptacle having a movable cover and a spring lock adapted to prevent the opening of said cover once the same has been closed, of means for closing said cover upon the removal of said receptacle from said casing, means for preventing the accidental locking of said cover prior to its insertion into the casing, and devices carried by the body of the receptacle and preventing its insertion into the casing until said locking-preventing means has been rendered inoperative.

6. In a fare box, the combination, with a casing and a receptacle insertible therein, said receptacle having a cover and a spring lock adapted to prevent the opening of said cover once the same has been closed, of means for closing said cover upon the removal of said receptacle from said casing, devices for preventing the accidental closing of said cover prior to the insertion of said receptacle into said casing, and means for preventing the insertion of said receptacle into said casing prior to the removal of said devices.

7. In a fare box, the combination, with a casing and a receptacle insertible therein, said casing having a removable side and said receptacle having a swinging cover, of means for preventing the insertion of said receptacle into said casing with its cover closed, means for preventing the removal of said receptacle from said casing with its cover open, means within said casing for securing said removable side in place, said means being concealed behind said cover when said receptacle is inside the casing, and means for automatically locking said cover upon the closing of the same.

8. In a fare box, the combination, with a casing and a receptacle insertible therein, said receptacle having a movable cover and a spring lock for securing the same once it is closed, of means for closing said cover upon the removal of the receptacle from the casing, a cup above said receptacle and having an open top and a tell-tale object adapted to be received in said cup and to be retained therein so long as said casing is maintained in upright position, said cup being arranged so as to render difficult or impossible the return of the telltale object thereto after the displacement of the same.

9. In a fare box, the combination, with a casing and a receptacle insertible therein, said receptacle having a movable cover and a spring lock for securing the same once it is closed, of means for closing said cover upon the removal of the receptacle from the casing, an inspection box carried by said casing and having a discharge opening beneath which said receptacle is inserted, a gate or door for said opening, means preventing the removal of said receptacle except when said gate or door is open, a cup in said inspection box and having an upwardly facing top, and a tell-tale object adapted to be received in said cup and to be retained therein so long as said casing is maintained in upright position, and adapted to fall out of the same upon the inversion of the box.

10. In a fare box, the combination, with a casing, and a receptacle insertible therein, said casing and receptacle being formed with interfitting projections whereby said receptacle is guided in its movement, of a cover hinged to said receptacle upon an axis transverse to the direction of movement thereof, projections carried by said cover, and ribs carried by the walls of said casing and adapted to receive said projections and to guide the same during the insertion and removal of said receptacle, said ribs being so arranged as to permit the insertion of said receptacle with the cover open and to prevent the removal of said receptacle except when said cover is closed.

11. In a fare box, the combination, with a rectangular casing having an opening in the lower portion of one of its ends, and a rectangular receptacle insertible therein, the height of said receptacle being slightly less than that of said opening and said casing and receptacle being formed with interfitting projections whereby said receptacle is guided in its movement, of a cover hinged to said receptacle upon an axis transverse to the direction of movement thereof, projections carried by said cover, ribs carried by the walls of said casing and adapted to receive said projections upon the introduction of said receptacle into said casing with its cover partly open and to guide the same so as to open said cover fully upon the complete insertion of said receptacle, and other ribs arranged to engage said projections upon the removal of said receptacle and force said cover to closed position.

12. In a fare box, the combination, with a rectangular casing and a rectangular receptacle slidably mounted therein, the inner wall of said casing being formed with guideways forming a closed path, of a cover hinged to said receptacle upon an axis transverse to the direction of movement thereof, ears carried by said cover and adapted to project into said guideways, and means for permitting the movement of said ears along said guideways in one direction and preventing the movement thereof in the opposite direction, said guideways being arranged to open said cover upon the insertion of said receptacle and to close the same upon the withdrawal thereof.

13. In a fare box, the combination, with a rectangular casing having an opening in the lower portion of one of its ends and having a guideway extending inwardly from said opening, of a rectangular receptacle slidably mounted in said guideways, the inner wall of said casing being formed with inclined guideways above said first guideways and also originating at said opening, a cover hinged to said receptacle upon an axis transverse to the direction of movement thereof, ears carried by said cover and adapted to project into said inclined guideways simultaneously with the insertion of said receptacle into said first guideway, the interior of the casing being formed with guideways communicating with said inclined guideways and with said first guideways and adapted to receive said ears from said inclined guideways and deliver them to said first guideways, and an irreversible switch device adapted to permit the movement of said ears from said inclined guideway to said last mentioned guideway and to prevent the movement of said ears in the opposite direction.

14. In a fare box, the combination, with a rectangular casing having a chute therein and a receptacle insertible within said casing and having an open top adapted to extend beneath said chute, of a cover hinged to said receptacle upon an axis transverse to the direction of movement thereof and adapted to close said open top, ears carried by said cover and projecting laterally therefrom, ribs carried by the walls of said casing and adapted to engage said ears and open said cover widely upon the insertion of said receptacle into the casing and to close said cover tightly upon the withdrawal of said receptacle from said casing, and means for preventing the insertion of said receptacle when the cover thereof is closed.

15. In a fare box, the combination, with a rectangular casing having a chute therein and a receptacle insertible within said casing and having an open top adapted to extend beneath said chute, of a cover hinged to said receptacle upon an axis transverse to the direction of movement thereof and adapted to close said open top, ears carried by said cover and projecting laterally therefrom, ribs carried by the walls of said casing and adapted to engage said ears and open said cover widely upon the insertion of said receptacle into the casing and to close said cover tightly upon the withdrawal of said receptacle from said casing, a spring actuated locking device adapted to engage said cover and secure the same upon the closing thereof, and means operatively connected to said locking device and adapted to be projected into obstructing engagement with said casing upon the displacement of said locking device.

16. In a fare box, the combination, with a casing having a chute, and a receptacle insertible in said casing and having an open top adapted to underlie the end of said chute, of a cover pivoted to said receptacle upon an axis substantially transverse to the direction of movement of the receptacle and adapted to close the open top of the same, laterally projecting ears carried by said cover, ribs carried by the walls of said casing and adapted to engage said ears so as to open said cover upon the insertion of said box into the casing, other ribs carried by the casing and adapted to engage said ears and close said cover upon the withdrawal of said receptacle, and an irreversible switch for permitting the passage of the ears from said first ribs to said second ribs and for preventing the return movement thereof.

17. In a fare box, the combination, with a rectangular casing and a parallel sided receptacle insertible therein, said receptacle and casing being formed with interfitting portions whereby the receptacle is guided, of a cover pivoted to said receptacle upon an axis substantially transverse to the direction of movement thereof, laterally projecting ears carried by said cover, the walls of said casing being formed with guideways adapted to receive said ears upon the insertion of said receptacle and move said cover to an open position and with other guideways adapted to receive said ears upon the withdrawal of said receptacle and force said cover to a tightly closed position, a ratchet wheel pivoted to the wall of said casing and having teeth adapted to receive said ears, said ratchet wheel being arranged to turn by the movement of said ears from the first passageway to the second passageway, and means for preventing the retrograde rotation of said ratchet wheel and so prevent the removal of said receptacle with the cover open.

18. In a fare box, the combination, with a parallel sided casing having a chute, and a parallel sided receptacle insertible into said casing beneath said chute, said receptacle and casing being formed with interfitting portions whereby the receptacle is guided, of a cover pivoted to said receptacle upon an axis substantially transverse to the direction of movement thereof, laterally projecting ears carried by said cover, the walls of said casing being formed with guideways adapted to receive said ears upon the insertion of said receptacle and move said cover to an open position and with other guideways adapted to receive said ears upon the withdrawal of said receptacle and force said cover to a tightly closed position, and a transferring device adapted to shift said ears from the opening guideway to the closing guideway while preventing the movement thereof in the opposite direction.

19. In a fare box, the combination with a rectangular casing and a receptacle insertible therein, said receptacle and casing being formed with interfitting projections whereby the receptacle is guided in its movement, of a cover hinged to said receptacle upon a transverse axis, laterally projecting ears carried by said cover, guideways formed in the wall of said casing and inclined away from the path of movement of said receptacle and adapted to receive said ears on the insertion of said receptacle so as to guide the cover to an open position, a ratchet wheel pivoted to the wall of said casing at the upper end of said guideway and having teeth adapted to receive said ears upon the insertion of said receptacle, a pawl engaging said ratchet wheel and preventing the retrograde movement thereof, a plate secured to the wall of the casing and covering said ratchet wheel and pawl, the face of said plate being cut away for the passage of said ears, and a second guideway formed in the wall of said casing and adapted to receive said ears upon the withdrawal of said receptacle and shaped to force said cover to closed position.

20. In a fare box, the combination, with a casing and a receptacle insertible therein, said receptacle having a movable cover and a spring actuated detent adapted to engage said cover so as to prevent the opening thereof once the same has been closed, of coöperating projections carried by said casing and receptacle whereby the receptacle is guided, other projections carried by said casing and cover and adapted to open said cover upon the insertion of said receptacle into said casing, further projections carried by said casing and adapted to close said cover upon the removal of said receptacle from said casing, means for preventing the insertion of said receptacle with its cover closed, means for rendering said detent inoperative so as to prevent accidental locking of the cover during the transportation of the receptacle. and means for preventing either the insertion or the removal of said receptacle while said detent is inoperative.

21. In a fare box, the combination, with a casing and a receptacle insertible therein, said receptacle being made in two parts, one of said parts being hingedly connected to the other part and a spring lock adapted to prevent the separation of the parts of said receptacle once the same have been brought together, of an inspection box carried by said casing and having a discharge opening beneath which one part of said receptacle is inserted, displaceable means normally closing said opening, a reciprocable member operatively connected to said displaceable means and adapted to be moved longitudinally upon the displacement of said means, an abutment member carried by said casing and adapted to engage said reciprocable member in a manner to prevent the movement thereof, one of said members being arranged to be engaged by one of the parts of said receptacle when the same is fully inserted into said casing so as to permit the free reciprocation of said first member, and means for bringing together the parts of said receptacle upon the removal of the same from said casing.

22. In a fare box, the combination, with a casing and a receptacle insertible therein, said receptacle having a movable cover and a spring lock adapted to prevent the opening of said cover once the same has been closed, of an inspection box carried by said casing and having a discharge opening beneath which said receptacle is inserted, displaceable means normally closing said opening, a reciprocable member operatively connected to said displaceable means and adapted to be moved longitudinally upon the displacement of said means, an abutment member carried by said casing beneath said reciprocable member and adapted to engage said reciprocable member in a manner to prevent the movement thereof, said reciprocable member being arranged to be raised out of engagement with said abutment member when said receptacle is fully inserted beneath said discharge opening, and means for closing said cover upon the removal of said receptacle from said casing.

23. In a fare box, the combination, with a casing and a cash box insertible therein, said cash box consisting of a receiving portion and a covering portion, of a hopper carried by said casing and having a discharge opening beneath which the receiving portion of said cash box is inserted, a gate for closing the passage through said hopper, means normally maintaining said gate in closed position, a movable member operatively connected to said gate so as to be shifted simultaneously with the opening and closing movements thereof, an abutment member carried by said casing and adapted to engage said movable member when said gate is closed in a manner to prevent the opening thereof, one of said members being arranged to be engaged by a part of said cash box and displaced out of contact with the other member so as to permit the free operation of said gate while the receiving portion of said cash box is in position beneath said hopper.

24. In a fare box, the combination, with a casing and a receptacle insertible therein, said receptacle having a cover hinged thereto upon an axis transverse to the direction of its movement and a spring lock adapted to prevent the movement of said cover once the same has been closed, of a hopper carried by said casing and having a discharge opening beneath which said receptacle is inserted, a gate for closing the passage through said hopper, means normally maintaining said gate in closed position, a reciprocable member operatively connected to said gate so as to be moved simultaneously therewith, an abutment member carried by said casing beneath said reciprocable member and adapted to engage said reciprocable member when said gate is closed in a manner to prevent the opening thereof, interengaging means carried by said cover and said casing for raising said cover upon the insertion of said receptacle into the casing, said reciprocable member being arranged to be raised by said cover out of contact with the abutment member so as to permit the free operation of said gate while said receptacle is in receiving position.

25. In a fare box, the combination, with a casing and a receptacle insertible therein, said receptacle comprising a receiving portion and a covering portion, of a hopper carried by said casing and having a discharge opening beneath which the receiving portion of said receptacle is adapted to be inserted, a gate adapted to close the passage through said hopper, means normally maintaining said gate in closed position, a movable member operatively connected to said gate and adapted to be moved simultaneously therewith, and an abutment member carried by said casing and adapted to engage said movable member to prevent the opening of said gate in the absence of said receptacle from the casing, one of said members being arranged to be engaged by one of the portions of said receptacle and displaced out of obstructing contact with the other member upon the insertion of said receptacle, one of the portions of said receptacle being also formed for interengagement with said movable member to prevent the withdrawal of said receptacle excepting when said gate is in open position.

26. In a fare box, the combination, with a casing and a receptacle insertible therein, said receptacle having an upwardly swinging cover and a spring lock adapted to prevent the opening of said cover once the same has been closed, of a hopper carried by said casing and having a discharge opening beneath which said receptacle is inserted, a gate adapted to close the passage through said hopper, means normally maintaining said gate in closed position, a reciprocable member operatively connected to said gate and adapted to be moved simultaneously therewith, an abutment member carried by said casing and adapted to engage said reciprocable member to prevent the opening of said gate in the absence of said receptacle from the casing, interengaging projections formed upon said casing and cover and adapted to raise said cover upon the insertion of said receptacle into the casing and close the same upon the withdrawal thereof, one of said members being arranged to be engaged by said cover upon the insertion of said receptacle and pushed out of obstructing contact with the other member, said cover being also formed with an aperture for the reception of said reciprocating member to prevent the withdrawal of said receptacle excepting when said gate is in open position.

27. In a fare box, the combination, with a casing and a receptacle insertible therein, said receptacle having a cover hinged upon an axis transverse to the direction of movement thereof, of a coin chute carried by said casing and having a discharge opening beneath which said receptacle is inserted, interfitting projections carried by said cover and casing for opening said cover upon the insertion of said receptacle and closing the same upon the removal of said receptacle, a gate for closing the passage through said chute, means for maintaining said gate in closed position, a reciprocable member operatively connected to said gate and movable therewith, an abutment member carried by said casing and adapted to be engaged by said reciprocable member to prevent the movement thereof and maintain said gate in closed position, said reciprocable member being so located as to be engaged by said cover upon the insertion of said receptacle and displaced out of engagement with said abutment member to permit the movement of said gate, and said cover being formed for engagement with said reciprocable member so as to prevent the removal of said box except when such gate is open.

28. In a fare box, the combination, with a casing and a receptacle insertible therein, said receptacle having a cover pivoted upon an axis transverse to the direction of movement thereof and said casing and cover being formed with interfitting projections and guideways whereby said cover is moved to open position upon the insertion of said receptable and is closed upon the removal of said receptacle, of a chute carried by said casing and having a discharge opening beneath which said receptacle is inserted, a rock shaft journaled at the side of said chute, a gate secured to said rock shaft and adapted to close said chute, an arm carried by said rock shaft, a reciprocable link articulated to said arm, a manually operated lever pivoted in the side of said casing and connected to the end of said link, a spring maintaining said gate normally closed, a reciprocable hook connected to said link and having a shoulder, a bracket carried by said casing and adapted to be engaged by said shoulder to prevent the movement of said hook and thus prevent the opening of said gate, said hook projecting into the path of said cover so as to be displaced out of contact with said bracket upon the insertion of said receptacle into the casing, and said cover being formed with an aperture for the reception of said hook whereby the removal of said receptacle is prevented except said gate be opened.

29. In a fare box, the combination, with a casing and a receptacle insertible therein, said receptacle having a movable cover and a spring lock adapted to secure said cover once the same is closed, said casing and cover being formed with interfitting projections and guideways whereby said cover is moved to open position upon the insertion of said receptacle and is closed upon the removal of said receptacle, of a chute carried by said casing and having a discharge opening beneath which said receptacle is inserted, a rock shaft journaled at the side of said chute, means for rocking the same, a gate secured to said rock shaft and adapted to close said chute, a spring maintaining said gate normally closed, an arm carried by said rock shaft, a reciprocable member connected to said arm and having a portion adapted to engage a portion of said receptacle, an abutment member adapted to engage said reciprocable member to prevent the opening of said gate, one of said members being arranged so as to be displaced out of contact with the other member upon the insertion of said receptacle into the casing, and said receptacle being formed for interengagement with said reciprocable member whereby the removal of said receptacle is prevented except said gate be opened.

30. In a device of the character described, the combination, with a rectangular casing having an opening in one of its ends, and having substantially horizontal guideways formed upon opposite sides in front of said opening, the sides of said casing being also formed with vertical guideways above said first guideways and at a distance from said opening and with upwardly inclined guideways originating in front of said opening and above said first guideways, said inclined guideways communicating at their rear and upper ends with said vertical guideways, of a receptacle insertible in said casing and formed to slide upon said first guideways, a cover pivoted to said receptacle upon an axis substantially transverse to the direction of movement, projections carried by said cover and adapted to follow said inclined and vertical guideways while said receptacle follows said horizontal guideways, the lower portion of said vertical guideways being formed with an inclined wall for the purpose of closing firmly said cover upon the removal of said receptacle, a spring lock carried by said receptacle and adapted to retain said cover in closed position, and irreversible switch means between said inclined guideway and said vertical guideway adapted to permit the movement of the cover projection from the inclined guideway to the vertical guideway, and to prevent retrograde movement thereof.

31. In a device of the character described, the combination, with a rectangular casing having an opening in one of its ends, and having parallel guideways formed upon opposite sides in front of said opening, the sides of said casing being also formed with said first guideways, said inclined guideways and at a distance from said opening and with upwardly inclined guideways originating in front of said opening and above said first guideways, said inclined guideways communicating at their rear and upper ends with said vertical guideways, of a receptacle insertible in said casing and formed to slide upon said first guideways, a cover pivoted to said receptacle upon an axis substantially transverse to the direction of movement, projections carried by said cover and adapted to follow said inclined and vertical guideways while said receptacle follows said horizontal guideways, the lower portion of said vertical guideways being formed with an inclined wall for the purpose of closing firmly said cover upon the removal of said receptacle, a spring lock carried by said receptacle and adapted to retain said cover in closed position, a ratchet wheel pivoted to said casing and having its teeth communicating with said inclined guideway and said vertical guideway, a plate secured to the wall of said casing and covering said ratchet wheel, the side of said plate being cut away to permit the movement of said projection from said inclined guideway to said vertical guideway, and pawls coöperating with said ratchet wheel and preventing the movement thereof in a direction to allow the projections to return from said vertical guideway to said inclined guideway.

32. In a fare box, the combination, with a casing and a receptacle insertible therein, said casing having a removable top and said receptacle having a swinging cover, of a hopper carried by said removable top, said receptacle when inside of said casing being located beneath said hopper, means for preventing the insertion of said receptacle into said casing with its cover closed, means for preventing the removal of said receptacle from said casing with its cover open, means within said casing for securing said removable top in place, said securing means being concealed behind said cover, an inspection box carried by said removable top and inclosing said hopper, and means within said casing for securing said inspection box in place, said last securing means being also concealed behind said cover so as to be inaccessible while said receptacle is in place in the casing.

In testimony whereof, I hereunto affix my signature in the presence of two witnesses.

WALTER T. COOK.

Witnesses:
HAROLD E. SMITH,
BRENNAN B. WEST.